(12) United States Patent
Chandrasekhar et al.

(10) Patent No.: US 11,722,569 B1
(45) Date of Patent: Aug. 8, 2023

(54) SYSTEM AND METHOD FOR PROVIDING A VIRTUAL MEDIA GATEWAY USING A SYSTEMS MANAGEMENT CONSOLE

(71) Applicant: Dell Products, L.P., Round Rock, TX (US)

(72) Inventors: Babu Krishna Chandrasekhar, Round Rock, TX (US); Farhan Syed, Bangalore (IN); Sudhir Vittal Shetty, Cedar Park, TX (US); Pushkala Iyer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/660,177

(22) Filed: Apr. 21, 2022

(51) Int. Cl.
*H04L 67/141* (2022.01)
*H04L 61/4523* (2022.01)
*H04L 9/40* (2022.01)

(52) U.S. Cl.
CPC ........ *H04L 67/141* (2013.01); *H04L 61/4523* (2022.05); *H04L 63/0407* (2013.01); *H04L 63/0838* (2013.01); *H04L 63/166* (2013.01)

(58) Field of Classification Search
CPC .............. H04L 67/141; H04L 61/4523; H04L 63/0407; H04L 63/0838; H04L 63/166
USPC ....................................................... 709/227
See application file for complete search history.

(56) References Cited

U.S. PATENT DOCUMENTS

| | | | | |
|---|---|---|---|---|
| 9,858,781 B1* | 1/2018 | Campero | ............... | H04L 9/3242 |
| 10,153,937 B1* | 12/2018 | Marr | .................... | H04L 41/0659 |
| 10,755,274 B2* | 8/2020 | Ortiz | ...................... | G06Q 20/36 |
| 10,917,305 B2* | 2/2021 | Shah | ................... | H04L 43/0858 |
| 10,972,431 B2* | 4/2021 | Grimm | ............... | H04L 63/0876 |
| 10,986,124 B2* | 4/2021 | Thomas | ............... | H04L 63/0236 |
| 11,140,195 B2* | 10/2021 | Grimm | .................. | H04L 63/145 |
| 11,263,229 B1* | 3/2022 | Basavaiah | ........... | G06F 16/2477 |
| 11,271,950 B2* | 3/2022 | Grimm | ............... | H04L 63/0272 |
| 11,423,327 B2* | 8/2022 | Kocberber | ............. | G06N 5/003 |
| 11,431,755 B1* | 8/2022 | Agarwal | ................ | H04L 63/20 |
| 11,443,166 B2* | 9/2022 | Shinde | ................ | G06F 11/3495 |
| 11,463,466 B2* | 10/2022 | Higgins | .............. | H04L 63/1416 |
| 2017/0126842 A1* | 5/2017 | Bingol | .................. | H04L 67/131 |
| 2017/0366304 A1* | 12/2017 | Fareed | .................. | H04L 1/1893 |
| 2018/0109626 A1* | 4/2018 | Miller | ....................... | G06F 9/54 |
| 2018/0218446 A1* | 8/2018 | Ries | ..................... | H04L 63/0853 |
| 2019/0068566 A1* | 2/2019 | Gandhi | ............... | H04L 63/0876 |

(Continued)

*Primary Examiner* — Melvin H Pollack
(74) *Attorney, Agent, or Firm* — Fogarty LLP

(57) ABSTRACT

Embodiments of the present disclosure provide a system and method for providing a virtual media gateway in which an Information Handling Systems (IHSs) configured on a private network may be managed using a systems management console. One embodiment of the virtual media gateway system includes a systems manager in communication with multiple server IHSs configured in a data center. The systems manager includes executable code to establish a first login session with a public network configured in the data center, and using the first login session, receive a request to communicate with one of the computing devices. The executable code is further executable to authenticate the systems manager with the one server IHS on behalf of the end-user to establish a second login session through a private network, and generate a console for providing user interaction with the one computing device via the second login session.

20 Claims, 6 Drawing Sheets

(56) References Cited

U.S. PATENT DOCUMENTS

| | | | |
|---|---|---|---|
| 2019/0089700 A1* | 3/2019 | Caldwell | H04L 63/0853 |
| 2019/0108363 A1* | 4/2019 | Caldwell | G06F 21/6245 |
| 2019/0114643 A1* | 4/2019 | Dewitt | G06Q 20/40145 |
| 2019/0116172 A1* | 4/2019 | Caldwell | H04L 67/306 |
| 2019/0165991 A1* | 5/2019 | Cheng | H04L 43/0817 |
| 2019/0228178 A1* | 7/2019 | Sharma | H04L 63/0853 |
| 2020/0137084 A1* | 4/2020 | Roy | G06F 21/554 |
| 2020/0244625 A1* | 7/2020 | Tummalapenta | H04L 12/4633 |
| 2020/0372172 A1* | 11/2020 | Murray | G06F 16/9024 |
| 2021/0012445 A1* | 1/2021 | Bartfai-Walcott | G06Q 20/1235 |
| 2021/0295329 A1* | 9/2021 | Lott | G06Q 20/42 |
| 2022/0035943 A1* | 2/2022 | Jones | G06F 16/248 |

\* cited by examiner

SYSTEM AND METHOD FOR PROVIDING A VIRTUAL MEDIA GATEWAY USING A SYSTEMS MANAGEMENT CONSOLE

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

Modern day computing resources are provided by large computing environments that may include server farms, computer clusters, individual computing devices, and/or data centers. Computing environments are generally associated with large organizations, such as business enterprises to educational institutions such as universities. In many cases, larger organizations may manage multiple server farms over a diverse geographical region. Nevertheless, management of such large, diversified computing environments are typically provided by remotely configured system management consoles. OpenManage Enterprise is one example of a system management console provided by Dell Technologies, which cost-effectively facilitates comprehensive lifecycle management for the computing devices of distributed computing environments from one console.

SUMMARY

Embodiments of the present disclosure provide a system and method for providing a virtual media gateway in which Information Handling Systems (IHSs) configured on a private network may be managed using a systems management console in communication with a publicly accessible network. One embodiment of the virtual media gateway system includes a systems manager in communication with multiple server IHSs configured in a data center. The systems manager includes executable code to establish a first login session with a public network configured in the data center, and using the first login session, receive a request to communicate with one of the computing devices. The executable code is further executable to authenticate the systems manager with the one server IHS on behalf of the end-user to establish a second login session through a private network, and generate a console for providing user interaction with the one computing device via the second login session.

According to another embodiment, a virtual media gateway method includes the steps of establishing a first login session with a public network configured in a data center that is configured with a plurality of IHSs, and using the first login session, receiving a request to communicate with one of the computing devices. The method further includes the steps of authenticating the systems manager with the one server IHS on behalf of the end-user to establish a second login session through a private network and generating a console for providing user interaction with the one computing device via the second login session.

According to yet another embodiment, a computer program product configured with executable instructions is executable, by at least one processor to establish a first login session with a public network configured in a data center configured with a plurality of server Information Handling Systems (IHSs), and using the first login session, receive a request to communicate with one of the computing devices. The instructions are further executable to authenticate the systems manager with the one server IHS on behalf of the end-user to establish a second login session through a private network, and generate a console for providing user interaction with the one computing device via the second login session.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments of the present disclosure provide a system and method for providing a virtual media gateway in which Information Handling Systems (IHSs) configured on a private network may be managed using a systems management console in communication with a publicly accessible network. Whereas modern day data center deployments often restrict access to their individual IHSs via private networks, access to those devices has been heretofore difficult to obtain when the systems management console that manages those devices does not inherently have access to those private networks. Embodiments of the present disclosure provide a solution to this problem, among others, by providing a virtual media gateway within the system management console so that it can individually authenticate each of the IHSs in the data center over the private network. The authentication process may be performed on the back-end so that a user of the systems management console is provided with a relatively seamless user experience by not being required to individually perform the authentication process for each IHS managed in the data center.

Management of a large, diversified data center is typically provided by a remotely configured system management console. Openmanage Enterprise is one example of a system management console provided by Dell Technologies, which cost-effectively facilitates comprehensive lifecycle management for the computing devices of distributed computing environments (e.g., data center) from one console. While such systems management consoles have been an effective tool for remotely managing IHSs, their use with those that are managed from a private network can sometimes become a difficult endeavor. For example, managers of computing environments, such as data centers, would like to maintain private network domains for maintenance of the IHSs of the data center. But conventional systems management console implementations have not been well suited for handling such out-of-band architectures.

Figure 1:
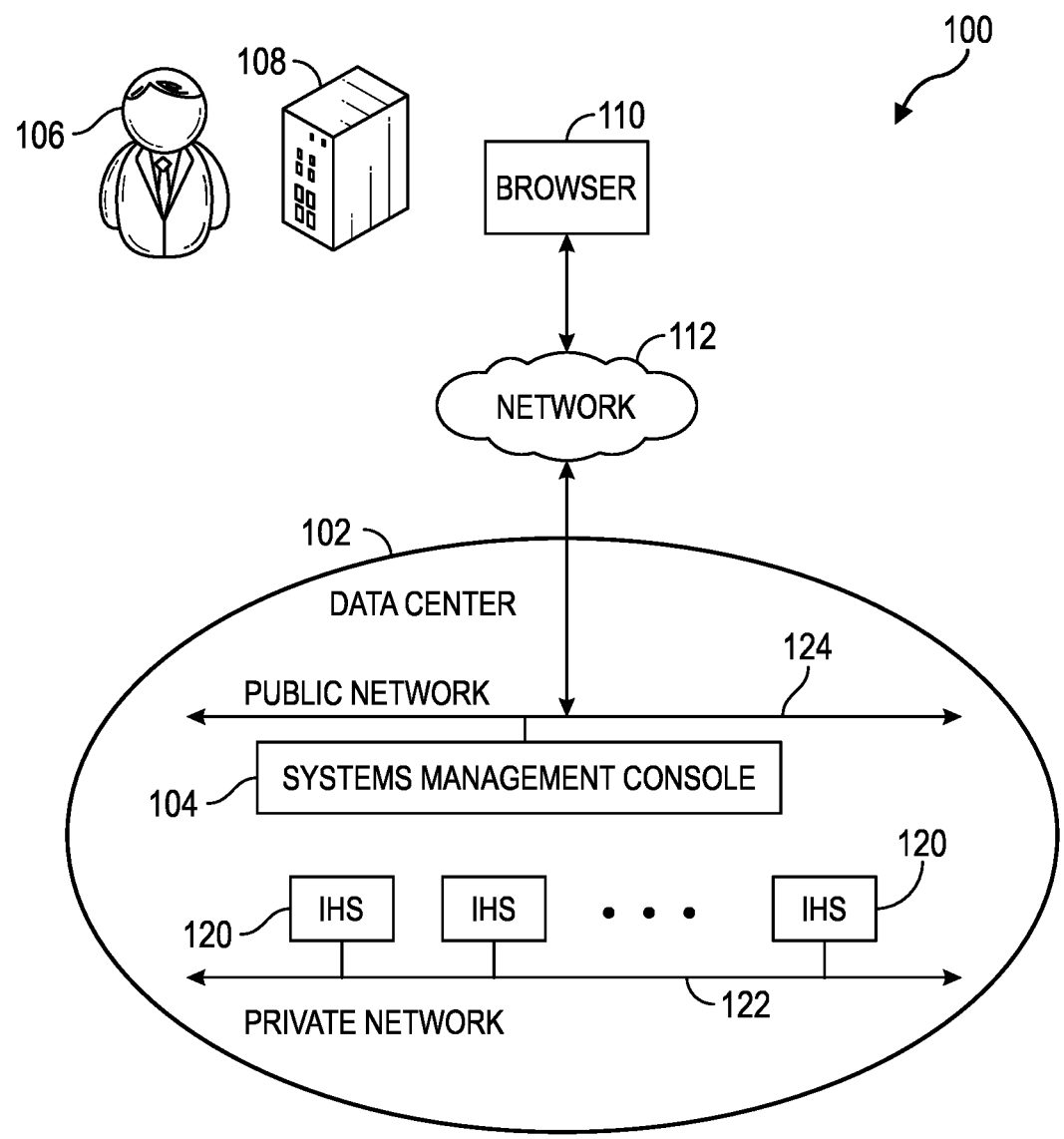
FIG. 1 illustrates an example virtual media gateway management system according to one embodiment of the present disclosure.

FIG. 1 illustrates an example virtual media gateway system 100 according to one embodiment of the present disclosure that may provide a solution to these problems, among others. The system 100 generally includes a data center 102 that is managed by a systems management console 104. A user 106 communicates with the systems management console 104 using an IHS 108 that executes a browser 110 (e.g., Firefox, Opera, etc.) through a publicly available network 112, such as the Internet. The data center 102 includes multiple server IHSs 120 that are in communication with a private network 122 in the data center 102. The browser 110, however, is only allowed to communicate with the systems management console 104 using a publicly available network 124 configured in the data center 102. As such, the systems management console 104 is configured with a virtual media gateway function that provides access to the server IHSs 120 by individually establishing a secure login session with each server IHS 120 in a manner that is seamless to the user experience of the user 106 by automatically generating login sessions for access and management of each of the server IHSs 120.

Many modern data center deployments have restricted access to its server IHSs 120 using private networks, such as network 122. Such an architecture may be useful for protecting the server IHSs 120 from malware attacks that could potentially occur when coupled to publicly available networks. Additionally, certain customer requirements have dictated that the systems management console 104, which is typically used to manage the server IHSs 120, is only accessible via a publicly available network 124 configured in the data center 102. As will be described in detail herein below, the virtual media gateway function may provide a solution to this problem by automatically establishing the login session from within the browser 110 used to access the systems management console 104 so that the individual server IHSs 120 can be effectively managed by the systems management console 104.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 2:
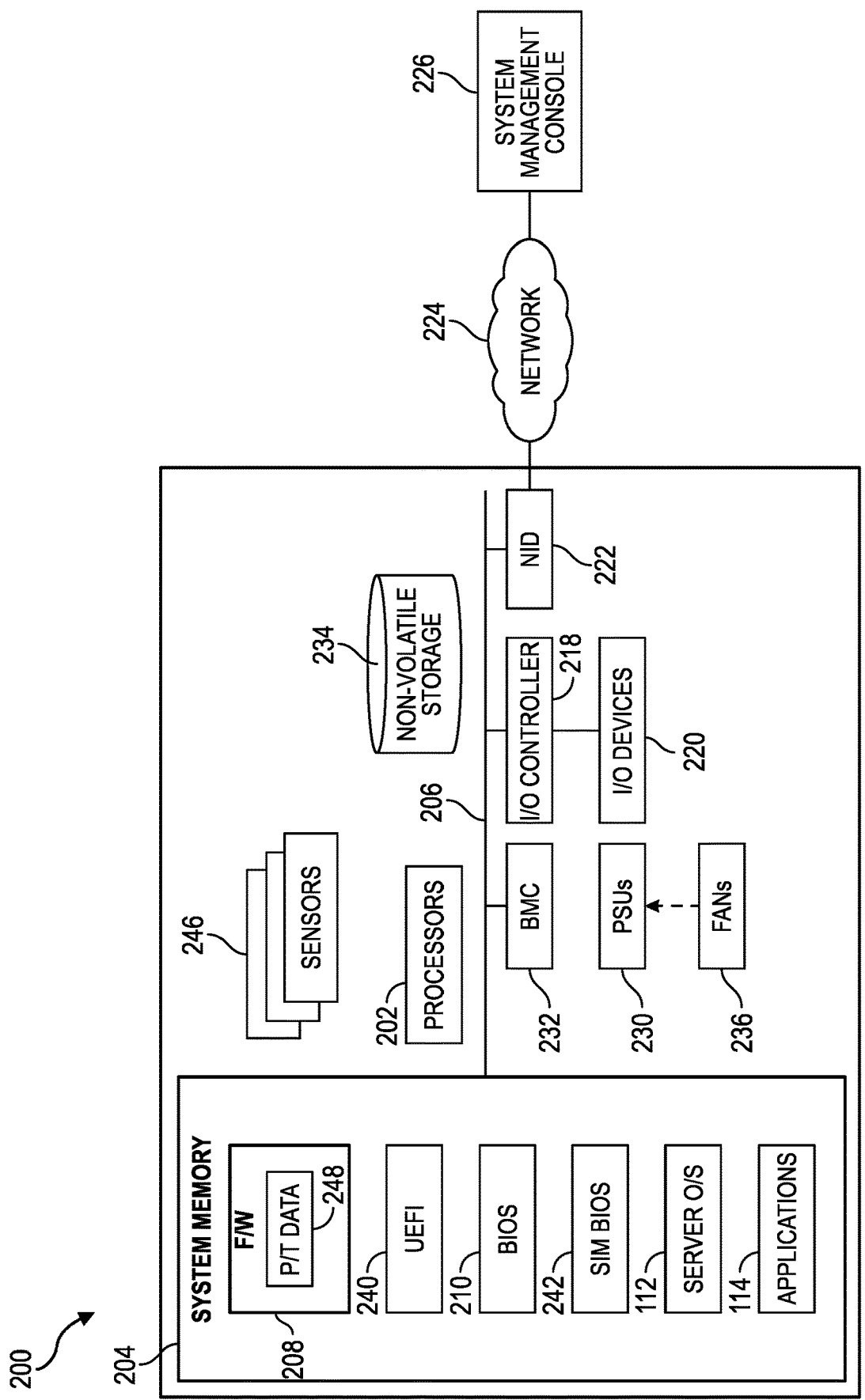
FIG. 2 is a block diagram of example components of an Information Handling System (IHS) that may be used to implement the virtual media gateway management system and method according to one embodiment of the present disclosure.

FIG. 2 is a block diagram illustrating several examples components of an Information Handling System (IHS) that may be used to implement a virtual media gateway management system and method according to one embodiment of the present disclosure. Particularly, IHS 200 includes one or more processor(s) 202 coupled to system memory 204 via system interconnect 206. System interconnect 206 may include any suitable system bus. System memory 204 may include a plurality of software and/or firmware modules including firmware (F/W) 208, basic input/output system (BIOS) 210, operating system (O/S) 212, and/or application(s) 214. Software and/or firmware module(s) stored within system memory 204 may be loaded into processor(s) 202 and executed during operation of IHS 200.

F/W 208 may include a power/thermal profile data table 248 that is used to store power profile data and thermal profile data for certain hardware devices (e.g., processor(s) 202, system memory 204, non-volatile storage 234, NID 222, I/O controllers 218, etc.). System memory 204 may include a UEFI interface 240 and/or a SMBIOS interface 242 for accessing the BIOS as well as updating BIOS 210. In general, UEFI interface 240 provides a software interface between an operating system and BIOS 210. In many cases, UEFI interface 240 can support remote diagnostics and repair of computers, even with no operating system installed. SMBIOS interface 242 can be used to read management information produced by BIOS 210 of an IHS 200. This feature can eliminate the need for the operating system to probe hardware directly to discover what devices are present in the computer.

IHS 200 includes one or more input/output (I/O) controllers 218 which manages the operation of one or more connected input/output (I/O) device(s) 220, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 200.

IHS 200 includes Network Interface Device (NID) 222. NID 222 enables IHS 200 to communicate and/or interface with other devices, services, and components that are located externally to IHS 200. These devices, services, and components, such as a system management console 226, can interface with IHS 200 via an external network, such as network 224, which may include a local area network, wide area network, personal area network, the Internet, etc.

For the purposes of this disclosure, the term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 200 further includes one or more power supply units (PSUs) 230. PSUs 230 are coupled to a BMC 232 via an I²C bus. BMC 232 enables remote operation control of PSUs 230 and other components within IHS 200. PSUs 230 power the hardware devices of IHS 200 (e.g., processor(s) 202, system memory 204, non-volatile storage 234, NID 222, I/O controllers 218, etc.). To assist with maintaining temperatures within specifications, an active cooling system, such as one or more fans 236 may be utilized.

IHS 200 further includes one or more sensors 246. Sensors 246 may, for instance, include a thermal sensor that is in thermal communication with certain hardware devices that generate relatively large amounts of heat, such as processors 202 or PSUs 230. Sensors 246 may also include voltage sensors that communicate signals to BMC 232 associated with, for example, an electrical voltage or current at an input line of PSU 230, and/or an electrical voltage or current at an output line of PSU 230.

BMC 232 may be configured to provide out-of-band management facilities for IHS 200. Management operations may be performed by BMC 232 even if IHS 200 is powered off, or powered down to a standby state. BMC 232 may include a processor, memory, and an out-of-band network interface separate from and physically isolated from an in-band network interface of IHS 200, and/or other embedded resources.

In certain embodiments, BMC 232 may include or may be part of a Remote Access Controller (e.g., a DELL Remote Access Controller (DRAC) or an Integrated DRAC (iDRAC)). In other embodiments, BMC 232 may include or may be an integral part of a Chassis Management Controller (CMC).

Figure 3:
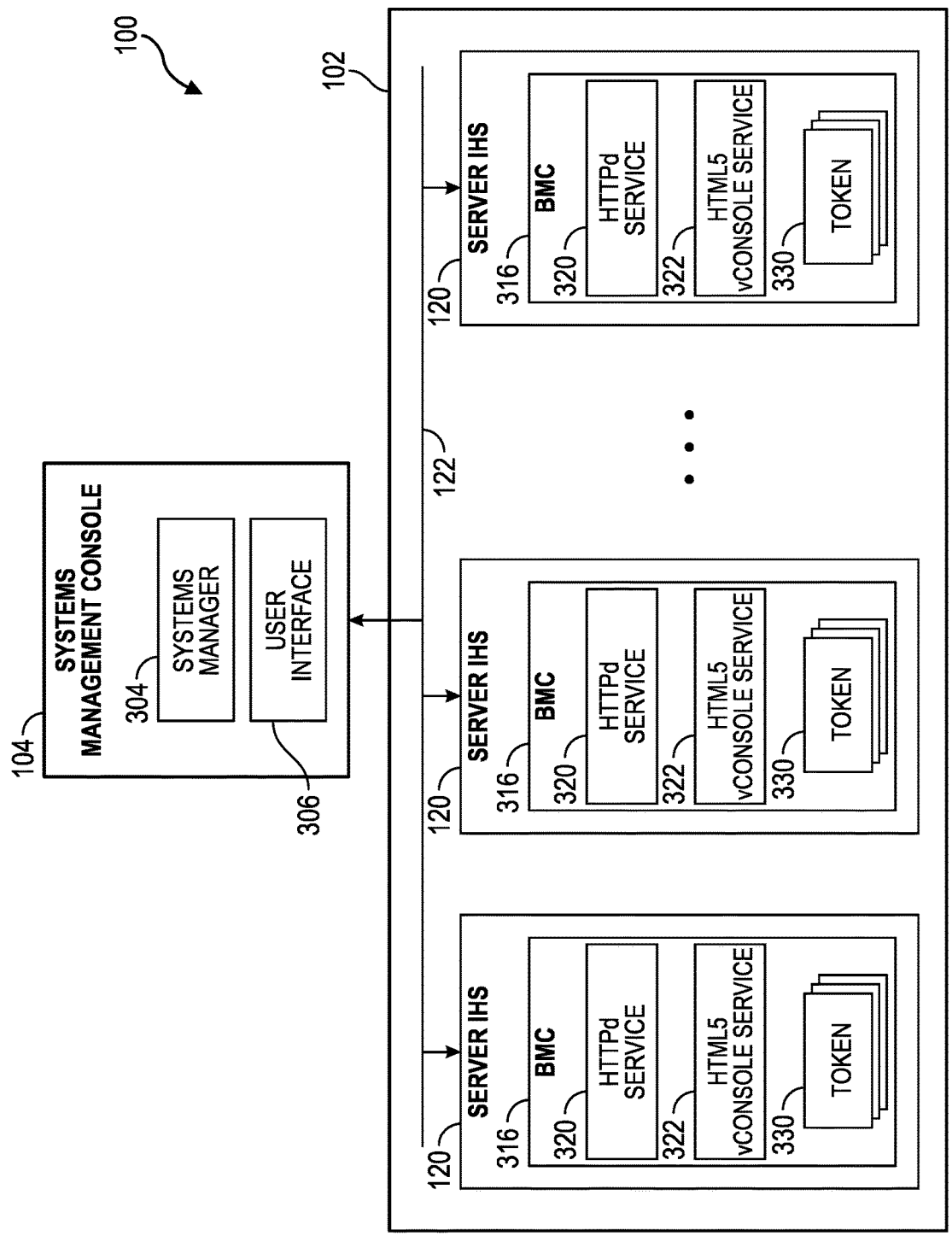
FIG. 3 is a diagram view illustrating several components of the example virtual media gateway management system according to one embodiment of the present disclosure.

FIG. 3 is a diagram view illustrating several components of the example virtual media gateway management system 100 according to one embodiment of the present disclosure. The virtual media gateway management system 100 includes a systems management appliance 104 installed with a systems manager 304 and a user interface 306. In one embodiment, the user interface 306 provides at least a portion of the features of the systems management console 126 described herein above. For example, the user interface 306 may be comprised of at least a portion of the browser 110 as described above with respect to FIG. 1. Additionally, the user interface 306 may be executed by the same systems management appliance 104 that is used to run the systems manager 304, or by another remotely configured IHS.

The systems manager 304 monitors and controls the operation of various computing devices as described above with reference to FIG. 2. In one embodiment, systems manager 304 includes at least a portion of the Dell EMC Open Manage Enterprise (OME) that is installed on a secure virtual machine (VM), such as a VMWARE Workstation.

The server IHSs 120 of the data center 102 are each configured with a Baseboard Management Controller (BMC) 316. The BMC 316 is used to monitor, and in some cases manage computer hardware components of their respective IHS 120. For example, the BMC 316 may allow information technology (IT) administrators to deploy, update, monitor, and maintain server IHSs 120 remotely. As a non-limiting example of a remote access controller, the integrated Dell Remote Access Controller (iDRAC) from Dell is embedded within Dell PowerEdge™ servers and provides such remote functionality.

The BMC 316 is configured with a front-end HTTPd service 320 and a back-end HTML5 vConsole service 322. The front-end HTTPd service 320 generally includes computer-executable instructions that functions as a server in a client-server model using a HTTPS network protocol. That is, the front-end HTTPd service 320 may receive requests from the systems manager, and forward those requests to the HTML5 vConsole service 322 for processing. The back-end HTML5 vConsole service 322 generally includes computer-executable instructions that function as a back-end to identify the identity of requests received from the front-end HTTPd service 320 and it so, generate one or more tokens 330 that may be used to authenticate the systems manager 304 with one of the server IHSs 120. Additional details describing how the front-end HTTPd service 320 may function with the HTML5 vConsole 322 will be described in detail herein below.

While the present embodiment is described as having a front-end HTTPd service 320 and a back-end HTML5 vConsole service 322 that may be used to authenticate the systems manager 304 with a server IHS 120 over a private network, it should be appreciated that in other embodiments, other authentication techniques may be utilized. In one embodiment, for example, the BMC 316 may use certain authentication protocols, such as Open Authentication (Oauth) protocol, an openID protocol, and the like to authentication the systems manager 304 through the private network 122. In another embodiment, the BMC 316 may communicate with an external global authentication authority, such as that provided by an open ID Connect (OIDC) authentication protocol. The OIDC authentication protocol may be beneficial in that it provides a federated identity, which links a user's digital identity across separate security domains, such as the publicly available network 124 and the private network 122 architectures.

Figure 4:
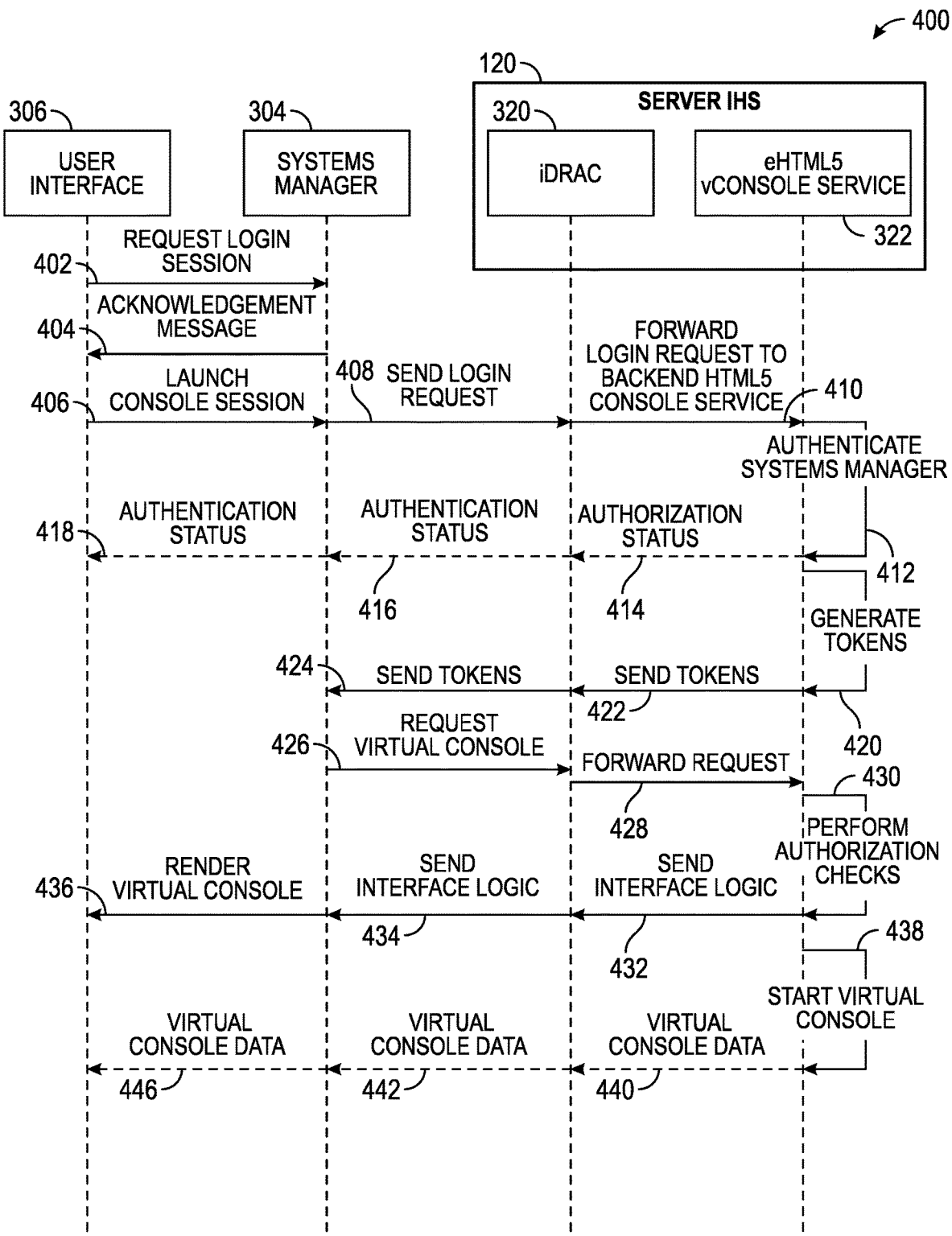
FIG. 4 is a workflow diagram describing certain steps that may be performed by a virtual media gateway management method using the systems manager according to one embodiment of the present disclosure.

FIG. 4 is a workflow diagram describing certain steps that may be performed by a virtual media gateway management method 400 using the systems manager 304 according to one embodiment of the present disclosure. Additionally or alternatively, the method 400 may be performed at least in part, using the virtual media gateway management system 100 as described herein above. Initially, the systems manager 304 has been started and is operating in a normal manner.

At step 402, the method 400 sends a request to establish a first login session between the user interface 306 and the systems manager 304. In a particular example, the user interface 306 may be a web browser that communicates with the systems manager 304 through a publicly available network, such as the Internet. Thereafter, the method 400 establishes the first login session, and sends an acknowledgment message to the user interface at step 404.

At step 406, the method 400 launches a server IHS console session in conjunction with the systems manager 304. For example, the method 400 may display a list of server IHSs 502 from within the user interface 306. (See FIG. 5A). Additionally, the method 400 may generate a server IHS console session from within the user interface 306 of the systems manager 304. FIG. 5B illustrates an example server IHS console screen 520 that may be generated on the user interface 306. Additional features associated with the server IHS console screen 520 will be described in detail herein below.

At step 408, the systems manager 304 sends a login request message to the front-end HTTPd service 320, which is then forwarded to the back-end HTML5 console service 322 at step 410. In one embodiment, the front-end HTTPd service 320 and back-end HTML5 console service 322 are executed on a BMC 316 configured in the server IHS 120. Thereafter at step 412, the HTML5 console service 322 authenticates the systems manager 304 for use with its respective server IHS 120.

In one embodiment, the systems manager 304 stores credentials associated with an administrator service account that was created on the HTML5 service 322 such that it receives those previously established credentials to authenticate the systems manager 304.

In another embodiment, the back-end HTML5 service 322 may be configured with delegated authorization so that the systems manager 304 could request an appropriate access token from an authorization server, such as an Oauth 2.0 authorization server or an OIDC compliant server. In such a case, the console would specify the token on the virtual console request, and additionally, the HTTPd service 320 would validate the token and make subsequent authorization decisions. Because the transaction occurs using an HTTPS link, it would be inherently secure. Additionally, since a token is used in place of standard credentials (e.g., username and password), any requirement for creating a service account on the BMC 316 would be eliminated. The workflow using an authorization server could be made even more secure by implementing certain features, such as short validity and one-time-use-only restrictions embedded within the token. These features would also be consistent with current authorization protocols, such as the OAuth 2.0 specification.

In yet another embodiment, the systems manager 304 may store a TLS certificate of its own to provide for mutual authentication with the server IHS 120. If client certificate authentication is enabled in the HTTPd service 320, the same can be used to verify the authenticity of the systems manager 304 so that a trust relationship can be established between the systems manager 304 and the BMC 316.

Once authenticated, the HTML5 service 322 sends the authentication status to the front-end HTTPd service 320 at step 414, which in turn, forwards the authentication status to the systems manager 304, which forwards the authentication status to the user interface 306 at step 418.

At step 420, the back-end HTML5 service 322 generates one or more tokens that are then sent to the front-end HTTPd service 320 at step 422, and in turn, sends the tokens to the systems manager 304 at step 424. That is, the back-end HTTP5 service 322 either authenticates the request if it is username/password-based or validates the access token if it is token-based. Upon successful authentication or validation, the back-end HTTP5 service 322 retrieves the username and privileges, generates one or more tokens (e.g., random 128-bit identifiers), and stores the tokens in its database after binding it with the authenticated username and associated privileges. In response to the authentication request, the back-end HTTP5 service 322 may also send a response containing these tokens back to the systems manager 304 as shown at steps 422 and 424.

At step 426, the systems manager 304 issues a request to launch a virtual console to the front-end HTTPd service 320 that includes the received tokens. At this point, the systems manager 304 may update its internal web socket rebinding logic, which may include executing certain web socket forwarding scripts and restarting the console web server without disturbing any existing user sessions. Also, certain systems manager code executed on the user interface 306 may make a request to download any interface logic (e.g. SDK code) required to render the HTML5 virtual console application on the user interface 306. The front-end HTTPd service 320 intercepts the request and forwards it to the back-end HTTP5 service 322 at step 428. Thereafter at step 430, the back-end HTTP5 service 322 retrieves the security parameters from the request and looks it up in its database. If found, the back-end HTTP5 service 322 performs authorization checks to ensure that the request has sufficient privileges. If so, the back-end HTTP5 service 322 at step 432, sends the interface logic to the front-end HTTPd service 320, which in turn, sends it to the systems manager 304 at step 434. Thereafter at step 436, the systems manager 304 renders the virtual console on the user interface 306.

Also when, at step 438, the back-end HTTP5 service 322 has ensured that the request has sufficient privileges at performed at step 430, it starts a virtual console session, and sends the virtual console session data to the front-end HTTPd service 320 at step 440. The front-end HTTPd service 320 then forwards the virtual console data to the systems manager 304 at step 442, which in turn, sends it to the user interface at step 446. At this point, the virtual console data is rendered on the virtual console of the user interface 306 to enable user interaction of the user with the server IHS 120. Nevertheless, when use of the method 400 is no longer needed or desired, the process ends.

Although FIG. 4 describes an example method 400 that may be performed for providing a virtual media gateway using a systems management console, the features of the method 400 may be embodied in other specific forms without deviating from the spirit and scope of the present disclosure. For example, the method 400 may perform additional, fewer, or different operations than those described in the present examples. As another example, the steps of the aforedescribed method 400 may be performed in a sequence other than what is described above.

Figure 5A:
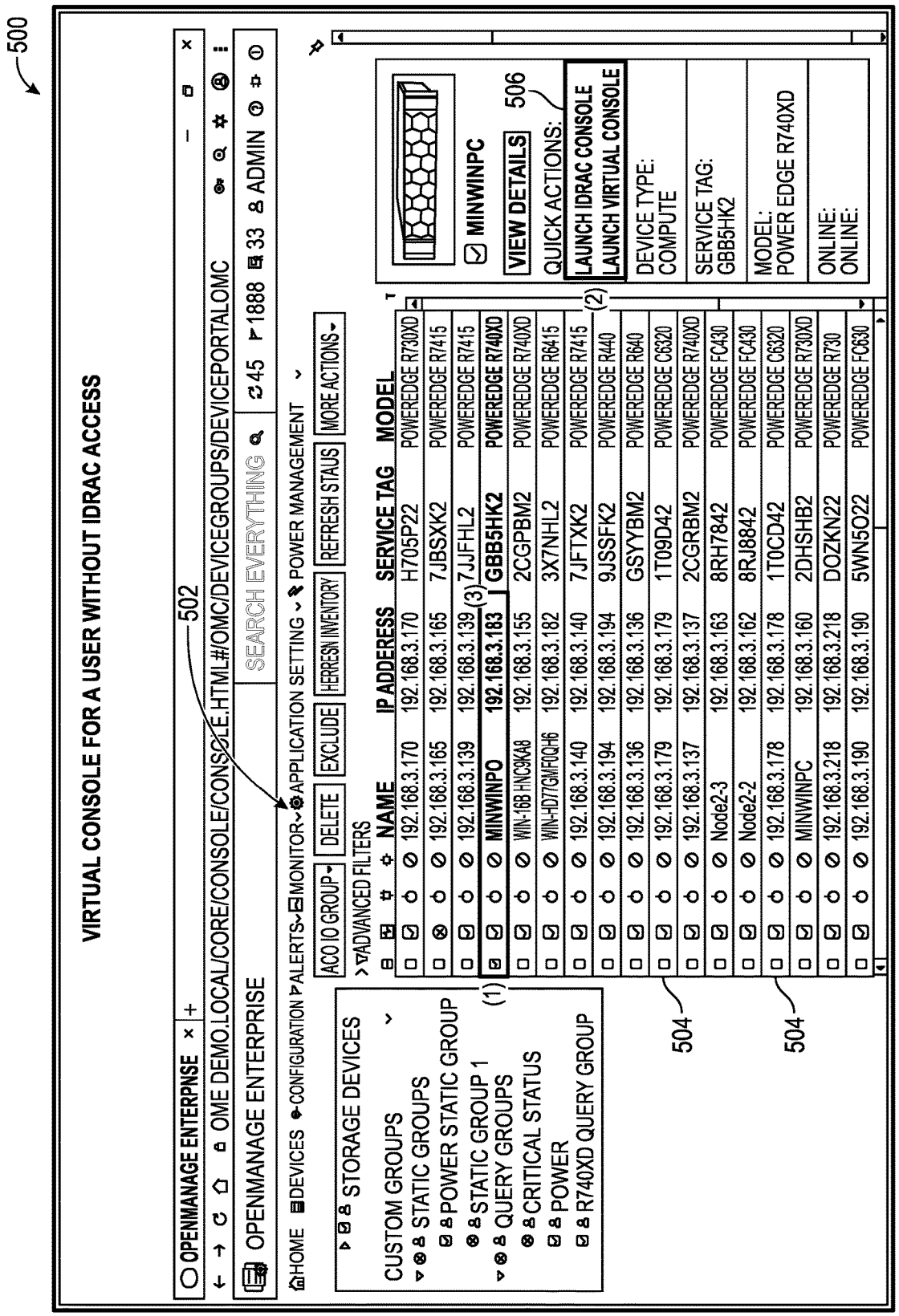
FIGS. 5A and 5B illustrate an example systems manager console screen and an example server IHS console screen, respectively, that may be generated by the system according to one embodiment of the present disclosure.
Figure 5B:
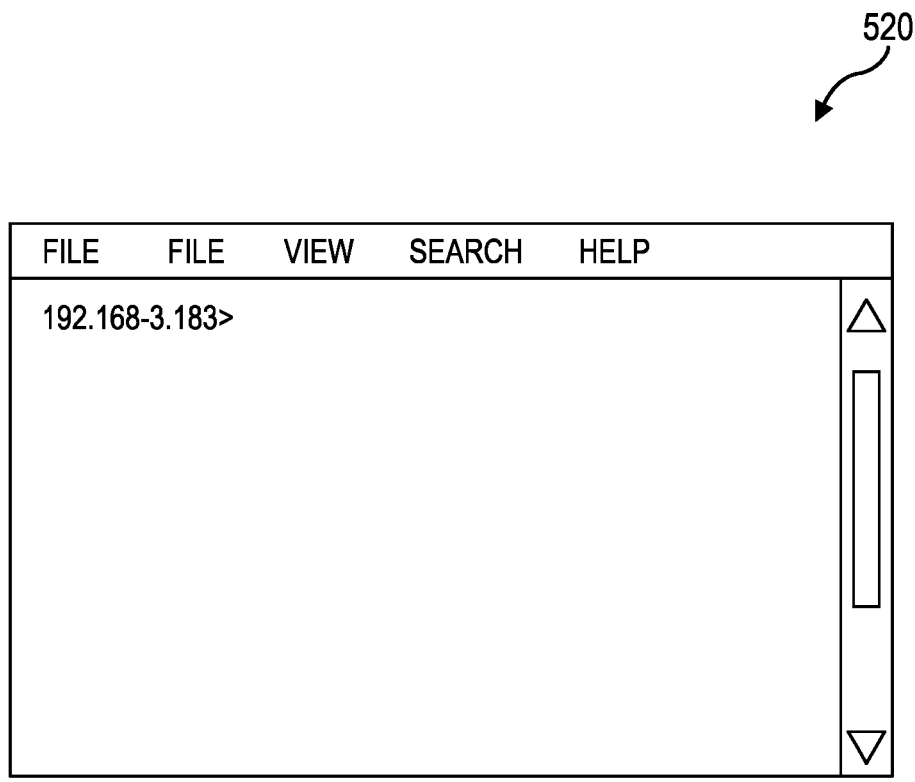

FIGS. 5A and 5B illustrate an example systems manager console screen 500 and an example server IHS console screen 520, respectively, that may be generated by the system 100 according to one embodiment of the present disclosure. The systems manager console screen 500 includes, among other things, a list of server IHSs 502 that are configured in the data center 102. The list of server IHSs 502 may include a number of rows 504 that each provides several details associated with one server IHS 120, such as a name of the server IHS 120, an IP address of the server IHS 120, a service tag associated with the server IHS 120, and the like. For example, the systems manager console screen 500 may be generated on the user interface 306 by the systems manager 304.

The systems manager console screen 500 also includes a server IHS console launch button 506 that when selected, causes the systems manager 304 to generate the server IHS console screen 520 on the user interface 306. The server IHS console screen 520 may be any suitable type that allows a user to interact with the server IHS 120, such as via a BMC 316 configured in the server IHS 120. A particular type of server IHS console screen 520 may include at least a part of a vConsole virtual console provided by DELL TECHNOLOGIES.

When the virtual console launch button 506 is selected, the system 100 may attempt to establish a second login session between the systems manager 304 and the server IHS 120 that was previously highlighted in the list of server IHSs 502. For example, if the user attempts to communicate with a particular server IHS 120, the user interface 306 may receive selection of a particular server IHS 120 from the list of server IHSs 502 (e.g., by highlighting the desired server IHS 120), followed by receiving selection of the virtual console launch button 506. By way of example, when the systems manager 304 receives user selection of the virtual console launch button 506, it may perform steps 406 through 446 to render the virtual console launch button 506 on the user interface 306 for enabling user interaction with the server IHS 120 associated with its front-end HTTPd service 320 and back-end HTTPS service 322.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A virtual media gateway system comprising:
   a systems manager in communication with a plurality of server Information Handling Systems (IHSs) configured in a data center, the systems manager comprising instructions stored in a memory that, upon execution by at least one processor, cause the processor to:
   establish a first login session with a public network configured in the data center;
   using the first login session, receive a request to communicate with one of the server IHSs;
   authenticate the systems manager with the one server IHS on behalf of the end-user to establish a second login session through a private network; and
   generate a console for controlling, by the systems manager, the operation of the one server IHS via the second login session.

2. The virtual media gateway system of claim 1, wherein the instructions, upon execution, further cause the processor to authenticate the first login session with a baseboard management controller configured in the one server IHS.

3. The virtual media gateway system of claim 2, wherein the instructions, upon execution, further cause the processor to authenticate the systems manager with a back-end HTML5 service executed on the baseboard management controller.

4. The virtual media gateway system of claim 3, wherein the instructions, upon execution, further cause the processor to provide the second login session via a secure IMPS port.

5. The virtual media gateway system of claim 1, wherein the instructions, upon execution, further cause the processor to authenticate the systems manager with the one server IHS to obtain an access token from a third-party authentication server, and use the token to establish the second login session.

6. The virtual media gateway system of claim 5, wherein the access token comprises a one-time-use only restriction.

7. The virtual media gateway system of claim 5, wherein the instructions, upon execution, further cause the processor to mutually authenticate the systems manager to the server IHS using a Transport Layer Security (TLS) certificate included in the access token.

8. The virtual media gateway system of claim 5, wherein the instructions, upon execution, further cause the processor to obtain the access token from a Lightweight Directory Access Protocol (LDAP) server.

9. The virtual media gateway system of claim 1, wherein the instructions, upon execution, further cause the processor to conceal the authentication of the first login session with the one server IHS from view on the console.

10. The virtual media gateway system of claim 1, wherein the instructions, upon execution, further cause the processor to inhibit the systems manager from communicating with the server IHSS through the public network.

11. A method comprising:
    establishing a first login session with a public network configured in a data center that is configured with a plurality of Information Handling Systems (IHSs);
    using the first login session, receiving a request to communicate with one of the server IHSs;
    authenticating the systems manager with the one server IHS on behalf of the end-user to establish a second login session through a private network; and
    generating a console for providing user interaction with the one server IHS via the second login session.

12. The method of claim 11, further comprising authenticating the first login session with a baseboard management controller configured in the one server IHS.

13. The method of claim 12, further comprising authenticating the systems manager with a back-end HTML5 service executed on the baseboard management controller.

14. The method of claim 11, further comprising authenticating the systems manager with the one server IHS to obtain an access token from a third-party authentication server, and use the token to establish the second login session.

15. The method of claim 14, further comprising mutually authenticating the systems manager to the server IHS using a Transport Layer Security (TLS) certificate included in the access token.

16. The method of claim 14, further comprising obtaining the access token from a Lightweight Directory Access Protocol (LDAP) server.

17. The method of claim 11, further comprising inhibiting the systems manager from communicating with the server IHSS through the public network.

18. A computer program product comprising a computer readable storage medium having program instructions embodied therewith, the program instructions executable by a processor to cause the processor to perform the following:

establish a first login session with a public network configured in a data center configured with a plurality of server Information Handling Systems (IHSs);

using the first login session, receive a request to communicate with one of the server IHSs;

authenticate the systems manager with the one server IHS on behalf of the end-user to establish a second login session through a private network; and generate a console for providing user interaction with the one server IHS via the second login session.

19. The computer program product of claim 18, wherein the systems manager is further executed to authenticate the systems manager with the one server IHS to obtain an access token from a third-party authentication server, and use the token to establish the second login session.

20. The computer program product of claim 18, wherein the instructions, upon execution, further cause the processor to authenticate the first login session with a baseboard management controller configured in the one computing device server IHS, and authenticate the systems manager with a back-end HTML5 service executed on the baseboard management controller.

* * * * *

UNITED STATES PATENT AND TRADEMARK OFFICE
CERTIFICATE OF CORRECTION

Page 1 of 1

PATENT NO. : 11,722,569 B1
APPLICATION NO. : 17/660177
DATED : August 8, 2023
INVENTOR(S) : Chandrasekhar et al.

It is certified that error appears in the above-identified patent and that said Letters Patent is hereby corrected as shown below:

In the Claims

In Column 10 Line 28 Claim 4, delete "to provide the second login session via a secure IMPS port." and insert --to provide the second login session via a secure HTTPS port.-- therefor.

In Column 11 Line 18 Claim 17, delete "IHSS through the public network." and insert --IHSs through the public network.-- therefor.

Signed and Sealed this
Fifth Day of September, 2023

Katherine Kelly Vidal
*Director of the United States Patent and Trademark Office*